(No Model.) 2 Sheets—Sheet 1.
F. H. POETSCH.
APPARATUS FOR MAKING COFFER-DAMS FOR FOUNDATIONS OF ALL KINDS.
No. 367,547. Patented Aug. 2, 1887.
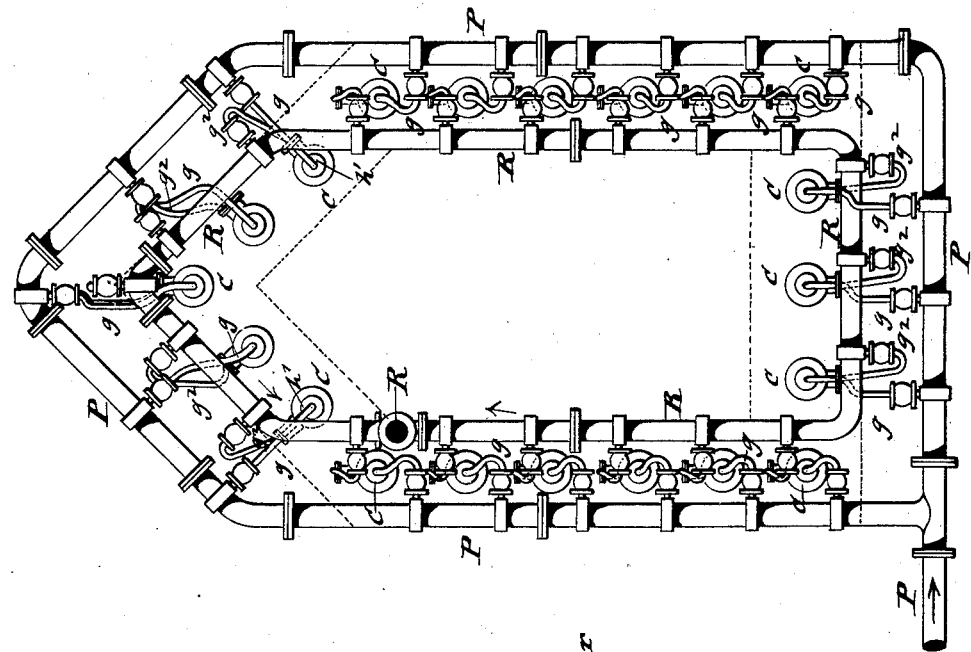
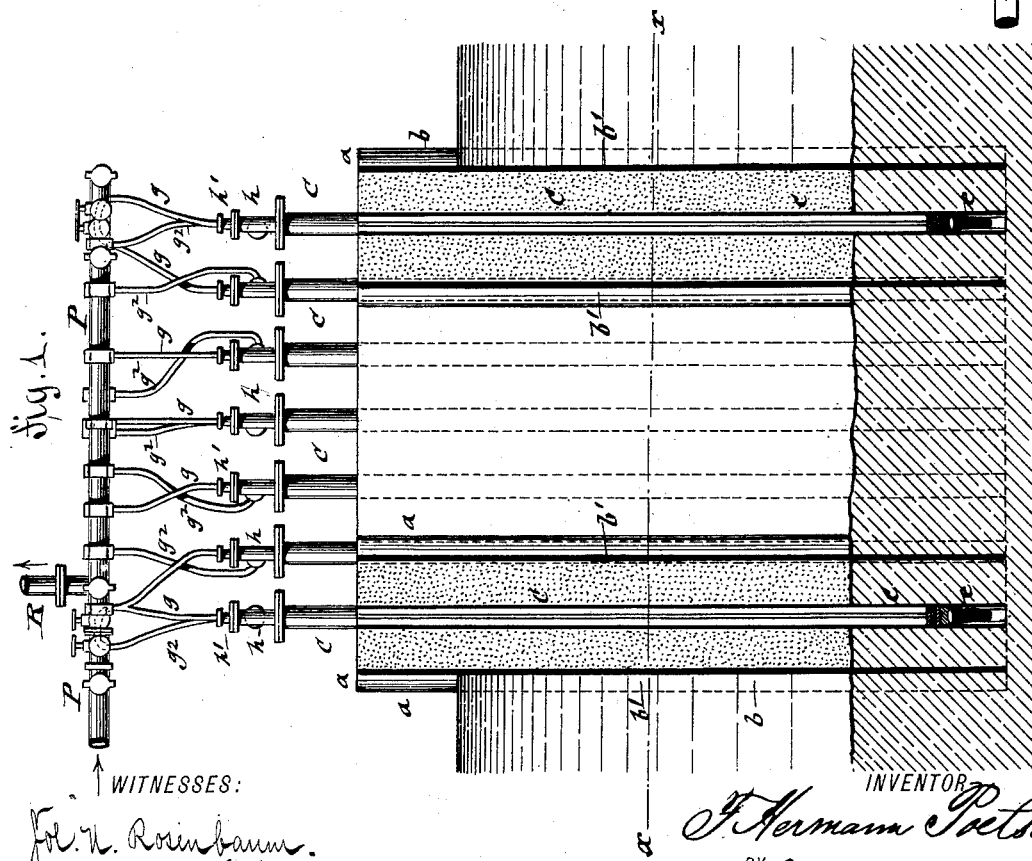
WITNESSES:
INVENTOR
F. Hermann Poetsch
BY
Goepel & Raegener
ATTORNEYS

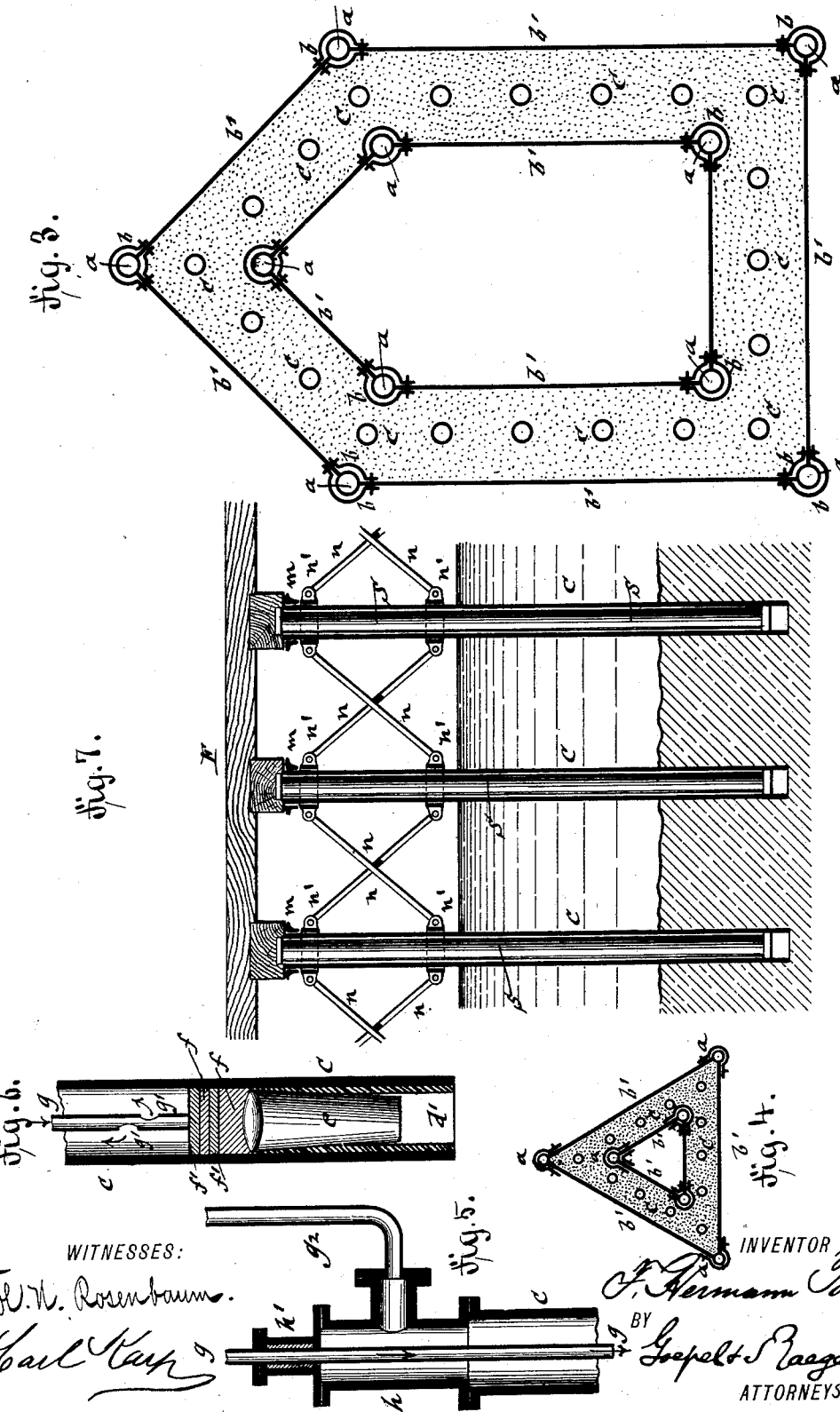

UNITED STATES PATENT OFFICE.

F. HERMANN POETSCH, OF ASCHERSLEBEN, PRUSSIA, GERMANY.

APPARATUS FOR MAKING COFFER-DAMS FOR FOUNDATIONS OF ALL KINDS.

SPECIFICATION forming part of Letters Patent No. 367,547, dated August 2, 1887.

Application filed October 1, 1885. Serial No. 178,689. (No model.) Patented in Italy June 7, 1885, XIX, 18,470, and in Germany January 1, 1886, No. 34,268, and November 4, 1886, No. 37,503.

*To all whom it may concern:*

Be it known that I, F. HERMANN POETSCH, of Aschersleben, in the Kingdom of Prussia, Empire of Germany, have invented certain new and useful Improvements in Apparatus for Making Coffer-Dams for Foundations of All Kinds, (for which I have obtained Letters Patent of Germany, No. 34,268, dated January 1, 1886, and No. 37,503, dated November 4, 1886, and of Italy, No. 18,470, dated June 7, 1885,) of which the following is a specification.

In the accompanying drawings, Figure 1 represents a vertical transverse section of my improved coffer-dam for building piers, quays, foundations, and other works in the water. Fig. 2 is a plan of the same; Fig. 3, a horizontal section on line $x$ $x$, Fig. 1; Fig. 4, a horizontal section of a modified form of coffer-dam. Figs. 5 and 6 are details of the upper and lower ends of the freezing-pipes, and Fig. 7 is a side elevation showing the freezing-pipes of the coffer-dam changed to pillars for supporting the frame employed for continuing the work above water.

Similar letters of reference indicate corresponding parts.

In the drawings, $a$ $a$ represent a series of vertical pipes or piles, which are driven into the river-bed to a somewhat greater depth than the depth of the foundation to be built, and near the points where the inner and outer corners of the coffer-dam are to be located. The size and shape of the coffer-dam have to correspond to the size and shape of the foundation to be made, and vary according to the different kinds of works to be performed, such as bridge-piers, quays, or other foundations or constructions to be executed in the water. In Figs. 1, 2, and 3 a coffer-dam having five sides is shown, while in Fig. 4 a coffer-dam of triangular shape is shown. The vertical corner pipes, $a$, of the coffer-dam are connected by stout wooden planks or strong plates $b'$, of boiler-iron, which are strapped to the corner pipes, $a$ $a$, by angular bands $b$ $b$, that are firmly screwed to the planks or bolts. Two walls—an outer and inner one—are thus formed at suitable distance from each other in the water, which walls form a kind of open chest, and which are not required to be water-tight. Intermediately between the inner and outer walls of the chest, freezing-pipes $c$ $c$ are driven into the ground to a depth of from eight to ten feet deeper than the bottom of the foundation to be built. The space between the inner and outer walls of the coffer-dam is then filled with fine sand, cement, or other appropriate material, which mixture is frozen into one solid body with the ground by forcing a suitable refrigerating-liquid through the freezing-pipes. For this purpose the freezing-pipes $c$ are provided at their upper ends with tubular cast-metal heads $h$, which are provided with stuffing-boxes $h'$, as shown in Fig. 5. Through the stuffing-boxes $h$ are passed the supply-pipes $g$, which communicate at their upper ends with a distributing-pipe, P, that serves to conduct the chilled brine from a refrigerating-machine of suitable construction to the freezing-pipes. The supply-pipes $g$ extend downward through the freezing-pipes $c$, and are provided at their lower ends with holes $g'$, through which the chilled brine or other freezing medium passes into the freezing-pipes $c$, which are of a considerably larger diameter than the supply-pipes $g$. The lower ends of the freezing-pipes $c$ are closed by inserting into the same a sleeve, $d'$, of tar or cement paper, forcing a lead stopper, $e$, into said sleeve, and covering said stopper with alternating layers of cement, $f$, and tar, $f'$, as shown in Fig. 6, whereby the freezing-pipes are closed in a perfectly tight manner. The cast-iron heads $h$ at the upper ends of the freezing-pipes $c$ are further provided with lateral T-pipes, that are connected by return-pipes $g^2$ with the main return-pipe R, which is connected to the refrigerating-machine, and which serves to return the brine or other refrigerating medium to the same, so as to be again chilled by the action of said machine and distributed to the freezing-pipes.

The refrigerating action of the freezing-pipes keeps the body of sand, cement, or other material in a frozen state, also the ground below the same, so that a solid, firmly-frozen coffer-dam is obtained below, or through which no water can enter or penetrate, and within which the work required for the piers, foundations, or other structures can be carried on. The water at the inside of the coffer-dam is next pumped out and the building operation carried on as on dry land.

The frozen wall of the coffer-dam has to be kept intact by the refrigerating-machine until the foundations are completed and the pier or other structure raised above the water-level. As soon as the pier or other structure rises above the water the necessity for keeping up the freezing operation ceases. The supply and return pipes R and P, $g$ and $g^2$, leading to the refrigerating-machine, are then disconnected from the freezing-pipes, and the corner pipes, $a\ a$, and walls $b'\ b'$ of the coffer-dam removed. The freezing-pipes are allowed to remain in the ground, and are employed as pillars for supporting the timbers of the frame F, on which the building operation for the structure is carried on. To strengthen the pipes $c\ c$, they are filled with cement or re-enforced by inserting into the pipes $c\ c$ pillars S, of cast or wrought iron of round or other suitable cross-section, as shown in Fig. 7. The space between the pillars S and the pipes $c$ is preferably filled with cement. The pipes $c\ c$ are strapped by ring-shaped angle-irons $m\ m$ to the timbers of the frame F, supported thereon, and are connected above the level of the water by diagonal braces $n\ n$, that are attached to collars $n'\ n'$, applied to the pipes $c$, as shown in Fig. 7.

By a coffer-dam of the construction described, foundations of piers and other structures in water can be quickly and cheaply built, as the coffer-dams can be made of smaller size and as all the material employed for the same can be used over again for the coffer-dams of other foundations.

Having thus described my invention, I claim as new and desire to secure by Letters Patent—

1. A coffer-dam consisting of a chest formed of outer and inner walls, a liquid filling, and freezing pipes located intermediately between said walls and supplied with a freezing medium, substantially as set forth.

2. A coffer-dam for piers and other foundations, consisting of a chest formed of supporting corner pipes or piles, planks or plates strapped to said pipes, and freezing-pipes driven into the ground at points within said chest and supplied with a freezing medium, substantially as set forth.

3. The combination of a chest the walls of which are formed of supporting corner pipes and planks or plates strapped to said pipes, freezing-pipes located intermediately between the walls of the chest, said freezing-pipes consisting of exterior pipes closed at their lower ends, interior supply-pipes open at their lower ends, a distributing-pipe connecting the supply-pipes with the refrigerating-machine, and a return-pipe connecting the exterior pipes with the refrigerating-machine, substantially as set forth.

4. The combination, with the freezing-pipe having a sleeve at its end, a lead plug driven into said sleeve, and alternating layers of tar and cement above said plug, substantially as set forth.

5. The combination, with the exterior freezing-pipes, of timbers strapped to the upper ends of the pipes, and diagonal braces applied to collars of the pipes, substantially as set forth.

6. The combination of the exterior freezing-pipes, interior re-enforcing pillars, timbers strapped to the pipes, and diagonal braces applied to collars of the pipes, substantially as set forth.

In testimony that I claim the foregoing as my invention I have signed my name in presence of two subscribing witnesses.

F. HERMANN POETSCH.

Witnesses:
B. ROI,
M. W. MOORE.